Feb. 13, 1951        R. F. ELLIS        2,541,224
ANIMAL HORN WEIGHT
Filed Nov. 28, 1947
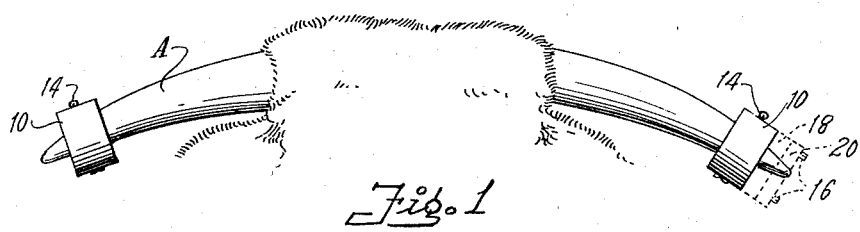
Fig. 1
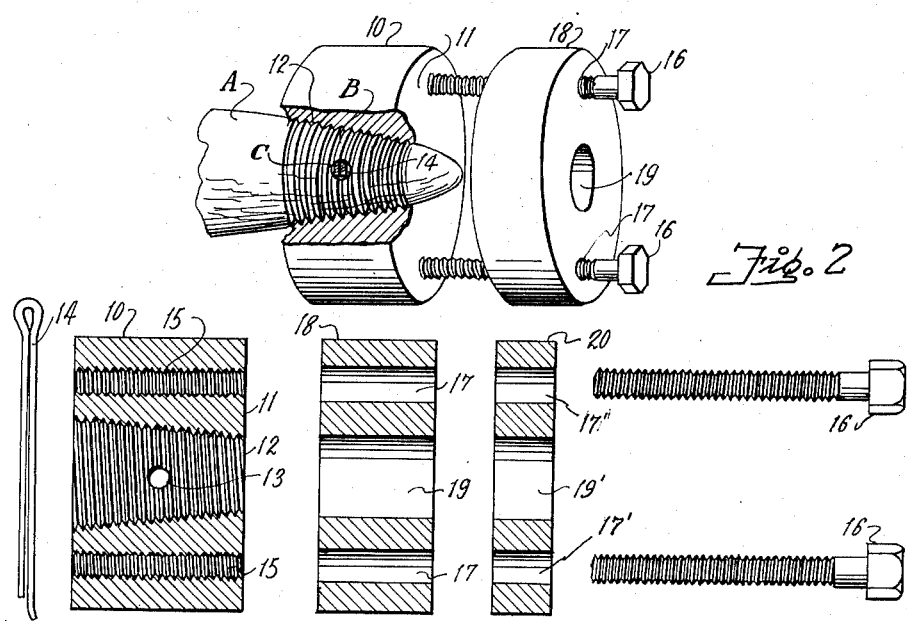
Fig. 2
Fig. 3
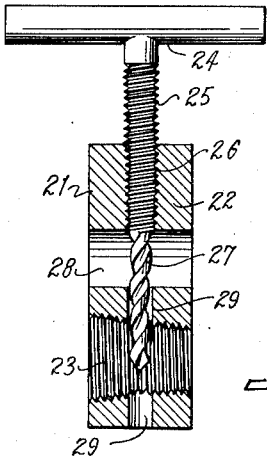
Fig. 4
Inventor
Reuben F. Ellis
Ashley & Ashley
Attorneys Patented Feb. 13, 1951

2,541,224

UNITED STATES PATENT OFFICE 2,541,224

ANIMAL HORN WEIGHT

Reuben F. Ellis, Irving, Tex.

Application November 28, 1947, Serial No. 788,520

2 Claims. (Cl. 128—76)

This invention relates to new and useful improvements in animal horn weights.

One object of the invention is to provide an improved horn weight for training the horns of an animal, such as a cow, steer or bull, to grow in a desired manner.

An important object of the invention is to provide an improved horn weight wherein a pair of weight members are immovably secured on the horns in a new and novel manner, thus preventing accidental displacement or loss thereof.

Another object of the invention is to provide improved weight member carrying means, whereby additional weight may be readily and securely added, thus varying the total weight in accordance with growing conditions.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is an elevation of the forehead of an animal having horn weights, constructed in accordance with this invention, applied to the horns, Fig. 2 is a perspective view of one of the weight collars in position on a horn, a portion being in section to show the screw threads, and a weight disk spaced from the collar prior to fastening said disk in place, Fig. 3 is an exploded view of the various elements of the weight, some being in section and others in elevation, and Fig. 4 is a transverse sectional view of the threading and boring tool.

In the drawing, the numeral 10 designates a primary weight collar which is made of metal or other material of sufficient weight for the purpose. The collar is annular but it may be of any suitable form. The collar has a flat outer side 11 and is provided with a central, tapered, screw-threaded bore 12, of such dimensions as to receive the tip portion of an animal horn. Medially of the collar, transversely alined holes 13 are provided diametrically of the bore. These holes receive a cotter pin 14 which passes through said collar and across the bore thereof. The collar is provided with longitudinal, parallel screw-threaded bores 15 on each side of the bore 12, the bores being diametrically opposed to one another and displaced 90° from the holes 13.

On mounting the collar upon an animal's horns, the tip portion of each horn A is provided with external screw threads B, by means hereinafter described. The collar is then screwed onto the threads B until tight. When the horns are screw-threaded, transverse holes C are drilled therethrough so that, when the collars are adjusted thereon, their holes 13 may be alined with the holes C. The cotter pins 14 are inserted in the holes 13 and C and spread, whereby the collars or weights are fastened against displacement.

It frequently becomes necessary to increase the magnitude of the weight employed. This can be readily accomplished without disturbing the collars 10. A pair of screw bolts 16 are passed through smooth bores 17 in secondary weight collars 18 and screwed into the bores 15 whereby the collars 18 are secured against the faces 11 of the collars 10. The secondary collars have a central opening 19 for the tip of the horn A. This secondary collar 18 may be of any suitable thickness and weight.

If desired a weight disk 20 of the same diameter and shape as the collars 18, may be used. This disk has smooth bores 17' and a central opening 19' co-acting with the bores and openings of the collar 18. The disk is somewhat less in thickness than the collar 18 and of less weight. The disk can be used in place of the collar 18 or in combination therewith.

An important feature is the screw threads B formed on the tip portion of the horn A. When the threads of the tapered bore 12 are engaged in the threads B, the collar 10 is tightly secured owing to the wedging action; however, the cotter pin 14 provides an additional fastening. Animals frequently get their horns under a fence wire or tree limb, and in withdrawing them, would strip off the ordinary weight or loosen it. The collar 10 cannot be loosened or displaced.

While any suitable tool may be employed, I prefer to use the tool 21 set forth in Fig. 4. The tool includes a pilot block 22 which has a tapered screw-threaded bore 23, which forms a die for cutting the horn threads B. An auger 24 is provided with a screw-threaded shank 25 engaging in a screw-threaded bore 26 in the block, radially of the bore 23 and having its longitudinal axis at substantially right angles to the longitudinal axis of said bore. The inner end portion of the auger is reduced and formed with a bit 27, which extends across an opening 28 in the block and has free passage through a transverse pilot opening 29, disposed diametrically of the bore 23.

In applying the weight collar, the screw threads B are first cut on the horn tip A. The auger 24 is withdrawn or retracted and the block 22 placed on the horn which is received in the bore 23. The bore is of such size as to locate the tool, a few inches inwardly from the point of the tip. By rotating the block with a wrench, the screw threads B are cut into the horn and said block is rigidly held on the horn. The auger 24 is then inserted and rotated to drill the hole C through the horn, after which the auger is retracted and the tool unscrewed from the horn. The weight collars 10 may then be positioned as hereinbefore described.

The foregoing description of the invention is explanatory thereof and various changes in the size, shape and materials, as well as in the details of the illustrated construction may be made within the scope of the appended claims, without departing from the spirit of the invention.

What I claim and desire to secure by Letters Patent is:

1. An animal horn weight including a primary collar having a screw threaded bore for screwing it on the horn of an animal and screw-threaded openings on each side of said bore, a secondary collar having a central horn opening and bores on each side of said opening, and screw bolts extending through the bores of the secondary collar and engaging in the screw-threaded openings of the primary collar for fastening the secondary collar thereto.

2. An animal horn weight including, a collar having a tapered bore for screwing it on a previously threaded animal horn and provided with conventional screw-threads, said collar having diametrically alined holes extending from its bore through its outer surface, and a fastening pin extending through the holes and across the bore diametrically of the collar and adapted to pass through an animal horn.

REUBEN F. ELLIS.

REFERENCES CITED

The following references are of record in the file of this patent:

UNITED STATES PATENTS

| Number | Name | Date |
|---|---|---|
| 456,887 | Cummins | July 28, 1891 |
| 1,334,200 | Weston | Mar. 16, 1920 |